US008612175B2

(12) United States Patent
Dalton et al.

(10) Patent No.: US 8,612,175 B2
(45) Date of Patent: Dec. 17, 2013

(54) MEASUREMENT DEVICE AND A SYSTEM AND METHOD FOR USING THE SAME (75) Inventors: Wayne Dalton, Kent, OH (US); Tim Raines, Munson, OH (US)

(73) Assignee: Pile Dynamics, Inc., Solon, OH (US)

( * ) Notice: Subject to any disclaimer, the term of this patent is extended or adjusted under 35 U.S.C. 154(b) by 225 days.

(21) Appl. No.: 13/159,719

(22) Filed: Jun. 14, 2011

(65) Prior Publication Data
US 2011/0313724 A1 Dec. 22, 2011

Related U.S. Application Data (60) Provisional application No. 61/356,396, filed on Jun. 18, 2010.

(51) Int. Cl.
G01B 5/18 (2006.01)

(52) U.S. Cl.
USPC .......................... 702/166; 73/11.03; 405/232

(58) Field of Classification Search
USPC ........ 702/166, 188, 158, 33; 73/11.03, 12.01, 73/82; 405/232
See application file for complete search history.

(56) References Cited

U.S. PATENT DOCUMENTS

| 3,676,652 A | 7/1972 | Milis, Jr. et al. |
| 4,117,600 A | 10/1978 | Guignard et al. |
| 4,439,764 A | 3/1984 | York et al. |
| 5,175,415 A | 12/1992 | Guest |
| 5,303,162 A | 4/1994 | Yoon |
| 5,978,749 A | 11/1999 | Likins, Jr. et al. |
| 6,301,551 B1 | 10/2001 | Piscalko et al. |
| 6,533,502 B2 | 3/2003 | McVay et al. |
| 6,638,191 B1 | 10/2003 | Hankins et al. |
| 7,458,421 B2 | 12/2008 | Barrow et al. |

OTHER PUBLICATIONS

International Search Report and Written Opinion dated Oct. 28, 2011 in related International Application No. PCT/US2011/040283.

*Primary Examiner* — Jonathan C Teixeira Moffat
*Assistant Examiner* — Hien Vo
(74) *Attorney, Agent, or Firm* — Rankin, Hill & Clark LLP (57) ABSTRACT A measurement device system and method of using the same for determining the depth of a pile being installed and/or the equipment used to install the pile. The device including an encoder assembly having a support attachable to a structural component of a rig wherein the support has a pivot joint coaxial with a load arm axis. The encoder assembly has a load arm rotatable about the arm axis and with a wheel near its distal end that is rotatable about a wheel axis with an encoder joined to the wheel that moves with the wheel. The encoder assembly further including a biasing assembly to urge the load arm and wheel into an engaged condition relative to the associated pile installation machine such that the wheel frictionally engages a surface of another structural component of the rig. Thus, the displacement of the first structural component relative to the second component rotates the wheel about the wheel axis and the encoder. This information can then be used to determine pile depth.

36 Claims, 8 Drawing Sheets

MEASUREMENT DEVICE AND A SYSTEM AND METHOD FOR USING THE SAME

This application claims priority to provisional patent application Ser. No. 61/356,396 filed on Jun. 18, 2010 which is hereby incorporated by reference.

The invention of this application relates to measuring devices and, more particularly, to a measuring device configured to work in connection with a wide range of pile installation recording and installation systems.

It is known in the art that the precise monitoring of the installation process of a pile or other structural member is important to both ensure that the completed pile is structurally sound and meets the specification for the particular superstructure that it is intended to support. Further, by accurately monitoring the installation process, it is not necessary to include large safety factors for the installed pile. As can be appreciated, when a pile is installed without monitoring systems or without accurate monitoring systems, a significant safety factor must be factored into the completed pile structure to ensure that it will support the intended loads.

BACKGROUND OF THE INVENTION

Systems designed to monitor and/or record the installation process of a pile are known in the art. In this respect, Likins U.S. Pat. No. 5,978,749, discloses a pile installation recording system and is incorporated by reference herein and forms part of the specification of this application. More particularly, the Likins Patent discloses a pile installation recording system for both driven piles and auger-cast piles. The disclosed system can record a variety of parameters or data received from one or more sensing devices that are either attached to the pile, attached to the rig, or in a measurement range from the rig and/or the pile. These sensing devices can be any sensing devices known in the art and can be used to determine a wide range of parameters including, but not limited to, sensing the depth of a driven pile or the depth of an auger in an auger-cast pile.

However, while Likins has been found to be a very effective system in the field, applicant has found that the depth measurement device of Likins has its limitations which for years went unresolved. In this respect and with reference to FIG. 3 of Likins, the sensing device in Likins that is used to determine the depth of the pile and/or auger is joined to line 56 by a three-roller system. While not shown, this three-roller system is supported by the structure of rig 10, but which engages line 56 at or near the boom 12 of rig 10. The three roller system includes an encoder wheel 52. Further, in order to account for the movement of the wire as it is unwound from line real or drum 54, the roller system is joined to a fixed rod (not shown) having a linear bearing configured to allow lateral motion of the measurement system while the wire is unwound. As is known if the art, the wire being unwound from a roll or drum of wire can have significant lateral movement in that the wire is wound across the entire surface of the drum supporting the wire. While the linear bearing arrangement is effective in handling the lateral movement of the wire, it is not effective in handling the changes in load in the direction of line 56 wherein it has been found that the support rod, that is used to support the linear bearing, often deforms or fails in use. In either case, this condition adversely affects the accuracy of the depth sensor and the failure of the system in the field can cause downtime for the pile installation process.

In addition, in that many rigs are not owned by the operator, it is often difficult or impossible to convince the rig operator to weld a support bar to the rig, which is necessary to operate this type of sensing system. These rigs can cost hundreds of thousands of dollars, if not millions of dollars, wherein the owners of the rig are often hesitant to allow the types of modifications to the boom structure of the rig which are necessary to support this sensing system.

Even if the owner of the rig can be convinced to weld the necessary fixed bar to the boom, the sensing device shown in Likins has been found to have issues with accuracy for several reasons. One such reason is the way in which the wire is pinched between the three-roller system. In this respect, the wire passes through the fixed three-roller system wherein two of the rollers are in line with the wire on one side of the wire and the third roller (encoder wheel 52) is centered between the axes of the first two rollers wherein the center roller must deflect the wire as it passes therethrough such that a portion of the wire arcs around the encoder wheel. While this deflection about the encoder wheel can be accounted for if it remains constant, it has been found that it changes as the tension of the wire changes. It is difficult to account for the amount of wrap about this encoder wheel wherein the system inherently produces some level of error.

In addition, while FIG. 3 of Likins shows the line 56 to extending vertically between pulley 58 and gearbox or hammer cage 20, this line often extends from pulley 58 at an angle toward gearbox/hammer cage 20. In that the line is not extending in the vertical plane, the angle relative to the gearbox or hammer cage must be factored into the data to determine the actual vertical movement of the cage relative to the leads of the rig. Again, if the angle relative to the cage was constant, this adjustment to the data could be easily calculated. However, the distance between pulley 58 and cage 20 affects the relative angle of the line wherein this angle changes as the cage is displaced away from the pulley. As can be appreciated, it is difficult to account for this ever-changing angle, which is especially true in that each rig can have a different angle and/or a different angle change. As a result, it has been found that this system works adequately for short piles; however, the system becomes less and less accurate as the pile length increases.

Yet another problem found with the depth measurement system disclosed in the prior art is that the data produced by the system can be corrupted if the line is allowed to go slack. In that the measurement system is joined to the line, the line itself becomes a variable that must be maintained as a constant. A slack condition in this line affects this constant and can produce error. Moreover, if this slack condition is not noticed, the error in the data may not be known, which would result in a less accurate data set for the pile installation period. Depending on the frequency of the slack condition, and the other factors discussed above, the resulting data could be corrupted enough to prevent its use in evaluating the structural integrity of the installed pile.

Over the years, attempts have been made to overcome the shortcomings of the depth measurement system in Likins in order to produce more accurate data. One such attempt was to use a spring loaded real (similar to a tape measure) that is joined between a fixed point on the rig and the hammer cage or gearbox. This separated the sensing device from line 56 thereby eliminating the variables associated with the movement of this line. However, this device was found to have its own problems, which prevented its effective use in the field. In this respect, the system is heavy and expensive, weighing over 200 pounds, and produces yet another wire on the rig, which must be managed. As is known in the art, the installation process of a pile (whether it is a driven pile or an auger-cast pile), can be harsh and have negative impacts on sensing systems and wire structures. Further, with respect to driven piles, the system is constantly moving up and down to hammer a pile into the ground. It has been found, that this real system can often get tangled and in the way of other structures of the rig wherein its effectiveness has been found to be limited.

In addition to Likins, U.S. Pat. No. 6,533,502 to McVay is also incorporated by reference and forms part of this specification. The McVay patent also discloses a system for the determination of pile parameters and includes at least one structure for measuring pile data. The system discloses a structure for measuring pile data that is disposed within a measurement range from a pile wherein a wireless transmitter is communicably connected to the structure for measuring pile data. As with Likins, the wireless transmitter for transmitting the pile data can be in connection with a remotely located receiver.

Another patent incorporated by reference and forming part of this specification is U.S. Pat. No. 6,301,551 to Piscalko. The Piscalko patent discloses a pile driving analyzer (PDA) which obtains, processes and/or stores pile driving data. The PDA is operable as an independent self-contained unit, or may be used in conjunction with a remote computer system. Position data indicative of the position of a pile, and pile data indicative of characteristics of a pile may be automatically input to the PDA. When used in conjunction with the remote computer system, the PDA may be controlled remotely by the remote computer system. Alternatively, the PDA may be controlled locally by an operator, and data acquired by the PDA provided to the remote computer system for monitoring and/or storage.

SUMMARY OF THE INVENTION

According to the invention of this application, provided is a measurement device that can be joined directly to a structural component of a rig, such as the load box, the tower, and/or hammer cage, and can function separately from any supporting wires.

More particularly, the system according to the invention of this application can be fixedly mounted directly to the gearbox or hammer cage and includes a roller wheel that is forced against the rig which can include being forced against one of the leads of the support tower. The wheel or roller, which is forced against one or more leads, is joined to an encoder that can measure the rotations of the wheel to determine the travel of the cage or gearbox along the tower. This data can be used to accurately measure the depth of a driven pile, an auger, or any other installation system.

More particularly, according to one aspect of the invention, provided is a measurement device for use with a pile installation machine for determining a depth of a pile being installed into a ground layer by measuring displacement of a working head of the pile installation machine. The measurement device can include an encoder assembly having a support bracket fixably attachable to a first associated structural component of an associated pile installation machine wherein the support bracket has a mounting arrangement for the fixable attachment to the first structural component and a pivot joint coaxial with a load arm axis. The encoder assembly can further include a load arm rotatable about the load arm axis and has a base end near the load arm axis and a distal end spaced from the load arm axis. The load arm can further include a wheel near the distal end that is rotatable about a wheel axis and the at least one encoder assembly further including an encoder joined to the wheel such that the wheel drives the encoder as it rotates. The encoder assembly can further include a wheel force biasing assembly loaded between the support bracket and the load arm configured to urge the load arm and wheel about the load arm axis into an engaged condition relative to the associate pile installation machine such that the wheel frictionally engages a surface of a second associated structural component and the displacement of the first structural component relative to the surface of the second structural component rotates the wheel about the wheel axis and thus rotates the encoder.

According to another aspect of the present invention, provided is a system for use with the pile installation machine and the system having a measurement device as described above along with a communication system and a computing system. The communication system can be used to control the flow of data between the measurement device and the computing system wherein at least the data generated by the encoder is transmitted to the computing system. The computing system can be configured to determine the depth of the associate pile from the data produced by the encoder assembly and rotation of the wheel. As can be appreciated, this same computer system can be configured to handle any other computing operation associated with the installation of a pile including those previously known in the art. Further, this computing system can be a hand held device and could even be a remotely operable system as is incorporated by reference above.

According to yet a further aspect of the invention, provided is a method of determining the depth of the pile being installed into the ground layer by measuring the displacement of a working head. The method can include the steps of:
providing a measurement device as described above;
securing the at least one encoder assembly to the first structural component;
adjusting the at least one encoder assembly such that the wheel frictionally engages the surface of the second associated structural component;
providing a computing system; providing a communication system to control the flow of data between the measurement device and the computing system;
generating rotational data based on the rotation of the wheel during the installation of the pile;
determining a displacement between the first structural component and the surface of the second structural component based on the rotational data; and,
calculating a depth of the pile based the displacement.

According to yet other aspects of the invention, the load arm can be pivotable about a second axis transverse to the load arm axis. Further, this second axis can be aligned with the load arm axis. Further, the at least one encoder assembly can include a control arm pivotable about the load arm axis and extending between a base end near the load arm axis and a distal end spaced from the base end. This control arm can be axially spaced from the load arm along the load arm axis and include a side load biasing assembly between the control arm base and distal ends. The biasing assembly can include a side load shaft generally parallel to and spaced from the load axis that extends between the control arm and the load arm. The side load biasing assembly can further include a biasing member loaded against the load arm and this biasing member can be configured to urge the load arm into a centered position while allowing controlled movement of the load arm about the second axis.

According to even yet other aspects of the invention, the side load shaft can be fixed to one of the control arm and the load arm and extends through an opening in the other of the control arm and the load arm. Further, the biasing member can be a pair of biasing members positioned on either side of the opening in the other arm and engaging the other arm.

While it has been found that the invention of this application works particularly well in connection with driven and/or cast piles which will be the topic of this application, the invention of this application has much broader application wherein this specification should be considered illustrative and not limiting. In addition, in the interest of brevity, the gearbox and/or hammer cage will be hereinafter collectively referred to as the load box.

By mounting the sensing device directly to the load box, many of the variables relating to data accuracy are eliminated. In this respect, by separating the sensing device from the load line and/or a separate line, the deflections in the lines, tension in the lines and/or angle of these lines discussed above are eliminated. Further, the load box is the working portion of the rig wherein its movement is directly proportional to the depth of the pile and/or auger. As discussed above in greater detail, the movement of the wire is not necessarily equivalent to the changes in the depth of the pile and/or auger.

In one embodiment, a single encoder assembly is fixedly secured to the load box of the rig. This can be at any position including, but not limited to, the top and/or bottom of the load box. The wheel force biasing assembly can be used to force or urge the wheel against one of the leads of the support tower of the rig. As a result of this configuration, movement of the load box causes the wheel of the sensing device to rotate about a wheel axis. This rotation can be used then to calculate the linear travel of the load box relative to the vertical tower of the rig.

In other embodiments, a first and a second encoder assembly can be joined to the load box (or other structural component of the rig), which can be used to further improve the accuracy of the system. In this respect, by including two encoder assemblies, which are monitoring the same data, this parallel data collection can be compared to one another to better ensure that the data is correct. Further, if an abnormality is detected by the comparison of the data of the two encoder assemblies, this abnormality can be more effectively handled by having this redundant system. Thus, the data of the two sensors can either be averaged and/or compared relative to one another to eliminate abnormalities of either individual sensor.

In one embodiment, the measurement device includes one or more wireless transmitters as is disclosed in Likins. This arrangement can include a transmitter which is fixed relative to the load box. As can be appreciated, the use of wireless technology eliminates a wire that can be broken or damaged in the harsh environment in which these systems are used. The wireless technology used with this data acquisition system can be any wireless technology known in the art. Further, the wireless device connected to these one or two sensors can be a transceiver wherein it both sends and receives data wherein the sensors can communicate with a control system that is used by the rig operator and/or engineer to monitor this data, other data and/or the operation in general. As is discussed above, this measurement system can be used by itself or in combination with other sensing devices, which are used to obtain data relative to the installation of the pile and which have been incorporated by reference into this application.

In yet other embodiments of the invention of this application, the encoder assembly can be mounted such that it engages pulley or the roller at the top of the boom. While this mounting arrangement does not eliminate all of the variables associated with the wire, its separation from the wire arrangement and measurement based on the rotation of the top pulley greatly reduces the variables and reduces the difficulties associated with mounting the system and operating system. Further, this mounting arrangement does not require permanent alteration of the rig or welding to the rig. As with the systems described above, the sensor used on this pulley can also be a wired system or a wireless system without detracting from the invention of this application.

In yet further embodiments of this application, the encoder assembly used to monitor the rotation of this pulley. Further, this can be used in combination with one or more sensors mounted directly to the load box. Again, this can be used for error detection to further improve the accuracy of the resulting system. In addition, in view of the simplicity and low cost associated with the encoder assembly of this application, a plurality of encoder assemblies can be used cost effectively for this data acquisition.

Further, these and other objects, aspects, features, developments and advantages of the invention of this application will become apparent to those skilled in the art upon a reading of the Detailed Description of Embodiments set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DETAILED DESCRIPTION OF EMBODIMENTS

Referring now to the drawings wherein the showings are for the purpose of illustrating preferred and alternative embodiments of the invention only and not for the purpose of limiting same, FIGS. 1, 2 and 5-8 show several views of a rig or pile installation machine RG including a measuring device according to several embodiment of this applications. However, while the invention of this application is being shown in connection with a hammer rig, the invention of this application can be used in connection with other machines including an auger cast pile installation machine.

More particularly, shown is measurement device 10 at least partially mounted to rig RG and the measuring device including an encoder assembly 12, a communication system 14 and a computer system 16. In the embodiment shown in FIG. 2, communication system 14 has a wireless system 18 in communication with a computer system 16 that also has a wireless system 19. The communication system can be any communication system known in the art including, but not limited to, a wired system, a wireless system, a transceiver, a cellular system, a cable system and/or even a satellite system. Further, as will be discussed below, the receiver of this data stream can also be a communication system as reference above or a computer system. Further, the computer system can be any computing system known in the art including, but not limited to, a personal computer, a laptop computer, a hand held computer, a phone, a cell phone, a computer pad, a calculator and/or even an application on a cell phone. Further, these computer systems can be located anywhere wherein in certain embodiments they are located on site such as in the cab of the rig, in a local office, or even being held by someone on the jobsite. In yet other embodiments, part of the system can be offsite or can communicate with additional systems that are offsite.

Figure 1:
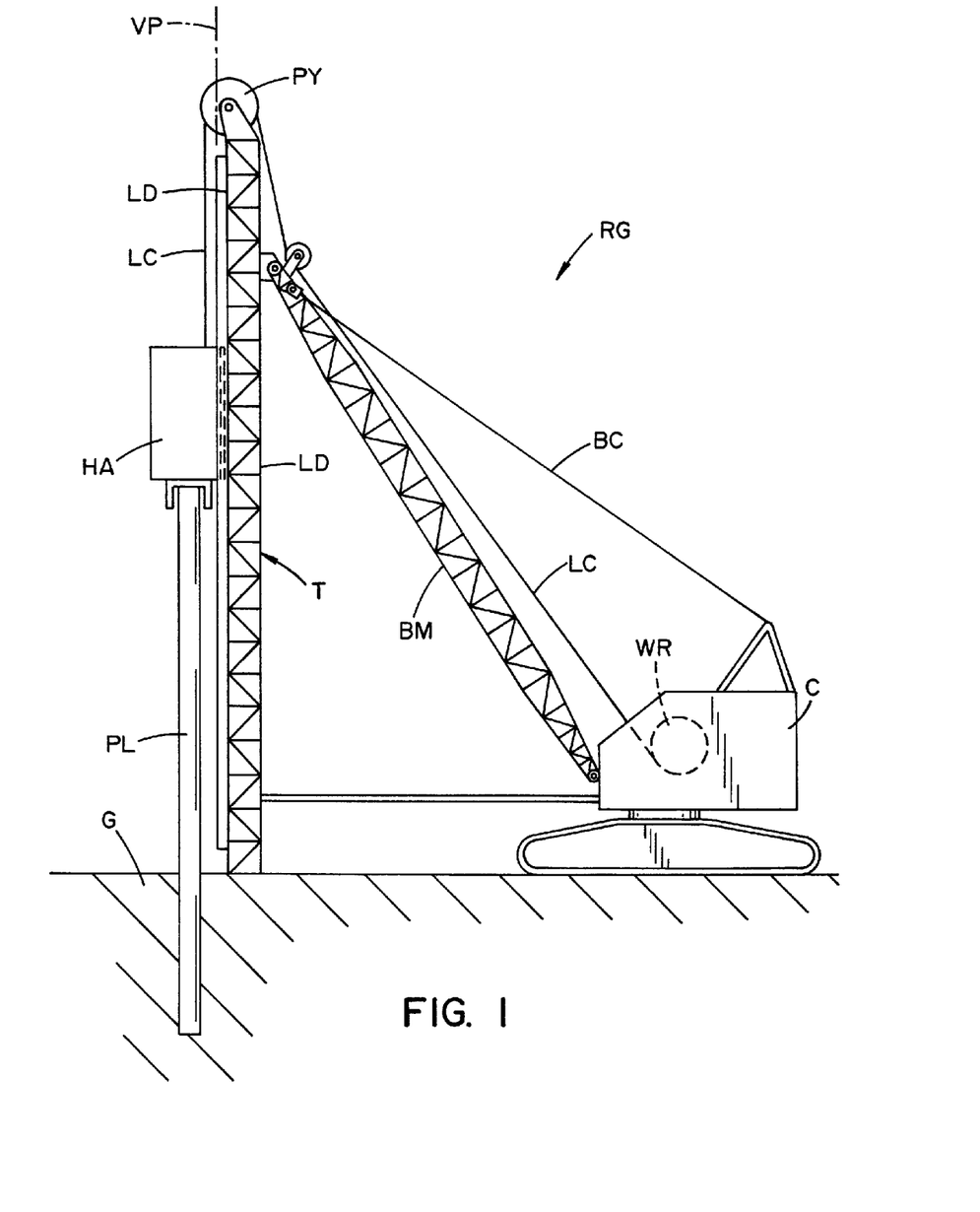
FIG. 1 is an elevational view of a pile installation machine and a hammer driven pile.

Again, Rig RG is intended to be illustrative only and is not intended to limit the invention of this application to a particular a particular style or type of rig. Conversely, it is intended to be only illustrative of a rig in general. In this respect, and as an example only, the invention of this application can also be used in connection with auger rigs for installing auger cast piles. For the rig shown, rig RG is for driven piles and includes a hammer assembly or load box HA that moves relative to tower T in a vertical plane to hammer a pile PL into a ground layer G. Pile rig RG generally comprises of a boom BM, leads LD, a load cable LC, a boom cable BC, one or more pulleys PY for a load cable LC, a wire real WR, and a cab C. Boom BM extends outward from the rigs cab to support and align tower T. Load cable LC extends from the wire real in cab, across pulley PY, and to hammer assembly HA. Cable LC supports the hammer assembly which is disclosed in greater detail in Likins which is incorporated by reference into this application and which is known in the art. In general, movement of cable LC results in vertical movement of the load box in a vertical plane VP and, as will be discussed more below, measuring device 10 is configured to monitor this movement to ultimately determine the progress of pile PL as it is driven into ground layer G in the vertical plane. In this respect, and as is known in the art wherein it will not be discussed in detail herein in the interest of brevity, each hammer impact includes an upward stroke wherein cable LC lifts load box HA vertically in the vertical plane and a downward stroke when then load box is released and the weight of the load box produces this downward stroke. If the downward stroke is larger than the upward stroke, the pile has been driven into the ground a distance equal to the difference between the downward and upward strokes. This difference can be monitored and used ultimately to determine the depth of the pile in ground layer G. With respect to auger cast piles, and the like, there is no upward and downward strokes in that the load box in these rigs slowly moves downwardly as the auger "drills" that hole in ground layer G and then slowly moves upwardly when the pile material or grout is pumped into the drilled hole. Thus, the invention of this application can be used to determine the depth of the "drilling" and the depth of the pumping during these operations in accordance with the invention of this application.

With respect to the measuring device of this application, encoder assembly 12 can have one or more support brackets 20. Further, support bracket 20 can be any support bracket configured to mount the encoder to the rig in one or more desired locations which will be discussed in greater detail below. In addition, the encoder assembly can be configured to be a "universal" assembly wherein it can have a mounting bracket allowing it to be mounting to a wide range of rigs and even mounted on difference places on one or more rigs. Conversely, other embodiments can be specially configured for a particular rig and/or a particular location on the rig (not shown).

In one set of embodiments, bracket 20 is an L-shaped bracket having one or more mounting opening 22 for securing the encoder assembly onto the rig. The opening or holes can be any shape known in the art including, but not limited to, circular openings and/or elongated slots as are shown which allow adjustment. Further, openings 22 can be in a base plate or leg 24 and/or in a side plate or leg 26. As can be appreciated, these mounting openings can be different than those shown in that the described preferred embodiments of this application are only illustrative and are not limiting. The mounting bracket according to the invention of this application can be any bracket configured to fixedly attach the encoder assembly to a particular object of the pile installation equipment and can take a number of forms based at least in part on how it is to be installed onto rig RG. Again, this assembly can be joined to a wide range of components of the rig without detracting from the invention of this application. This can include the encoder assembly being attached to the load box and/or vertical tower which is shown in the figures.

Encoder 12 further includes a load arm 30 which, as is shown, can be an adjustable load arm having a first arm section 32 and a second arm section 34. As can be appreciated, this arm could also be telescopic without detracting from the invention and/or can have other configurations to allow adjustment of its overall length. These arm section can include adjustment openings 36 for one or more fasteners 37 wherein the overall length of load arm 30 can be adjusted as is needed, but will allow a desired load arm length to be maintained for a particular job even in the harsh environment of pile driving. Again, the encoder can have a general design for use with a wide range of rigs wherein the encoder assembly can be configured to be adjustable to work on a wide range of rigs. In addition, load arm 30 includes a roller or wheel 38 that can be joined to second arm section 34 and rotate about a wheel axis 39 which will be discussed in greater detail below.

Encoder 12 can further include a separate control arm 40 which can be use used to help maintain the alignment of the load arm relative to a surface S of rig RG. As is shown, surface S is a part of a rail RL that is mounted to a tower T of rig RG. Rail RL can be a rail intended to maintain and align the load box or can be a separate rail solely for encoder 12. However, surface S could also be an existing surface of rig RG including, but not limited to, a surface on one or more of leads LD of tower T.

More particularly, load arm 30 is configured to pivot about a load arm axis 44 which is generally fixed relative to the support bracket. Further, in this embodiment, axis 44 is transverse to vertical plane VP. Similarly, control arm 40 can pivot about axis 44 and can pivot with load arm 30. As is shown, both control arm 40 and load arm 30 can be joined to bracket 20 by a pivot shaft 46. As will be discussed in greater detail below, load arm can also be joined to pivot shaft 46 by a ball joint 48 to allow movement of the load arm about a second axis at least partially transverse to axis 44.

The arms also include a wheel force biasing member 50 that can be any biasing member including, but not limited to, a coil spring, a polymeric spring, a pneumatic spring, to exert a downward force or load force in the load arm. In the embodiment shown, the biasing member is a coil spring joined to the control arm by a biasing shaft 52 that can extend through the control arm and which is joined to the support bracket at a joint 54. Joint 54 can be any joint including, but not limited to a threaded fastener 56 extending though a mounting hole in plate 26. Further, biasing shaft can be a threaded shaft to allow for an adjustment feature 58 which can be a nut and a washer that can be tightened against spring 50 to produce a desired downward load on the load arm. With reference to these figures, the wheel force spring is a compression spring and produces a downward force on the load arm indirectly, by way of the control arm, causing rotation of the load arm in a clockwise direction (FIG. 6) about axis 44.

In yet further embodiments (not shown), the biasing member 50 is attached directly to the load arm wherein the control arm can be eliminated. However, in view of the extreme amount of motion associated with installing a pile, the pile encoder system or assembly can include provisions for accounting for these motions. In this respect, the control arm can be joined to the load arm by a side load shaft 60 which can be fixed to either arm and includes a biasing member 62 that engages the opposite arm. In the embodiment shown, shaft 60 is joined to control arm 40 and extends from the control arm through an opening 64 in the load arm. Further, opening 64 can be an elongated opening to account for movement of load arm 30 transverse to axis 44 about ball joint 48. As with other biasing members in this application, any biasing member known in the art can be utilized. As shown, biasing member 62 includes a first and a second coil spring 66 and 68, respectively, mounted on either side of arm 30. Again, this side load shaft could be joined to the load arm and include one or more biasing members engaging the control arm without detracting from the invention of this application. As with other components of the invention of this application, the side load shaft also can be adjustable. In this respect, the side load shaft can be a threaded shaft and can include adjustment nut 70 for changing the spring force of the side load mechanism. As can be appreciated, a second adjustment feature (not shown) could also be used for spring 66.

Springs 66 and 68 can be compression springs and produce an inward force towards load arm 30 that is intended to generally keep the load arm centered at a given or designated position. This side load spring configuration allows the load arm to pivot a controlled amount about an axis transverse to load arm axis 44 which helps the pile encoder assembly to account for relative movements between the (for example) load box and leads which are other than the changes in depth. This feature, in combination with the adjustability of spring 50, allows the encoder assembly to be extremely adjustable so that it can be used in a wider range of environments. Further, the adjustability of these spring members can also be used to account for wear on the device wherein these springs can be tightened as springs begin to loose their spring force and or the joints begin to tighten or loosen with age.

As is known in the art, the load box is typically joined to the leads of the vertical tower in such a way that they are capable of slight movement relative to one another in a direction other than the vertical plane shown in the drawings. The side load spring assembly accounts for this movement to help prevent wheel 38 from becoming disengaged from the wheel or vertical leads. This has been found to further improve accuracy by maintaining a good connection between the wheel and the engaged object.

The encoder assembly further includes an encoder 90 that can be joined relative to wheel 38 such that encoder 90 also rotates about axis 39. However, as can be appreciated, encoder could rotate about a different axis. Further, encoder 90 can be any encoder known in the art including, but not limited to, one or more incremental encoders, optical encoders and/or magnetic encoders. Further, a fastener 92 can be used to secure wheel 38 to a shaft that rotates about axis 39 which can be used to join the wheel relative to the encoder. Any fastener arrangement known in the art can be used for encoder 90. In one embodiment, fastener 92 can include a set screw, or the like, and the wheel and/or encoder can be joined to a keyed shaft (not shown). In one set of embodiments, the shaft can be a D-shaped shaft or a shaft that includes one or more D-shaped portions. The set screw and/or the hub of the wheel or encoder can be configured to engage the flat portion of the D-shape to prevent unwanted relative rotation between the wheel and the encoder. In certain embodiments, fastener 92 can include an end hole (not shown) in the shaft that runs along axis 39 and this end hole can be a threaded hole to allow for the threaded engagement by a fastener. In all embodiments, washers, lock washers, spacers, thread locking adhesives, and/or other fastening components and/or accessories known in the art can be used to secure the wheel and/or encoder, maximize accuracy and/or reduce downtime.

Figure 2:
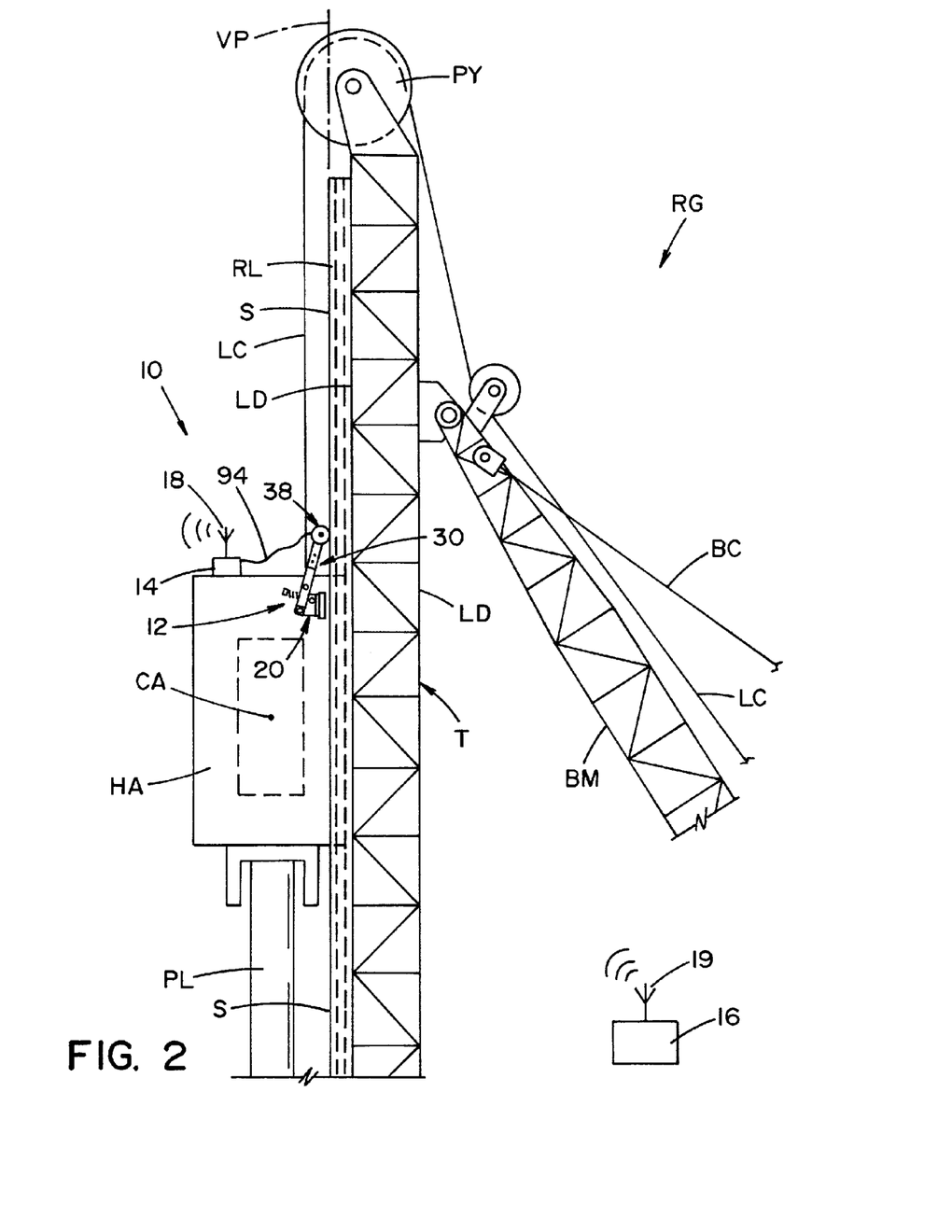
FIG. 2 is an enlarged elevational view of showing a single encoder assembly arrangement according to one set of embodiments of this application.
Figure 6:
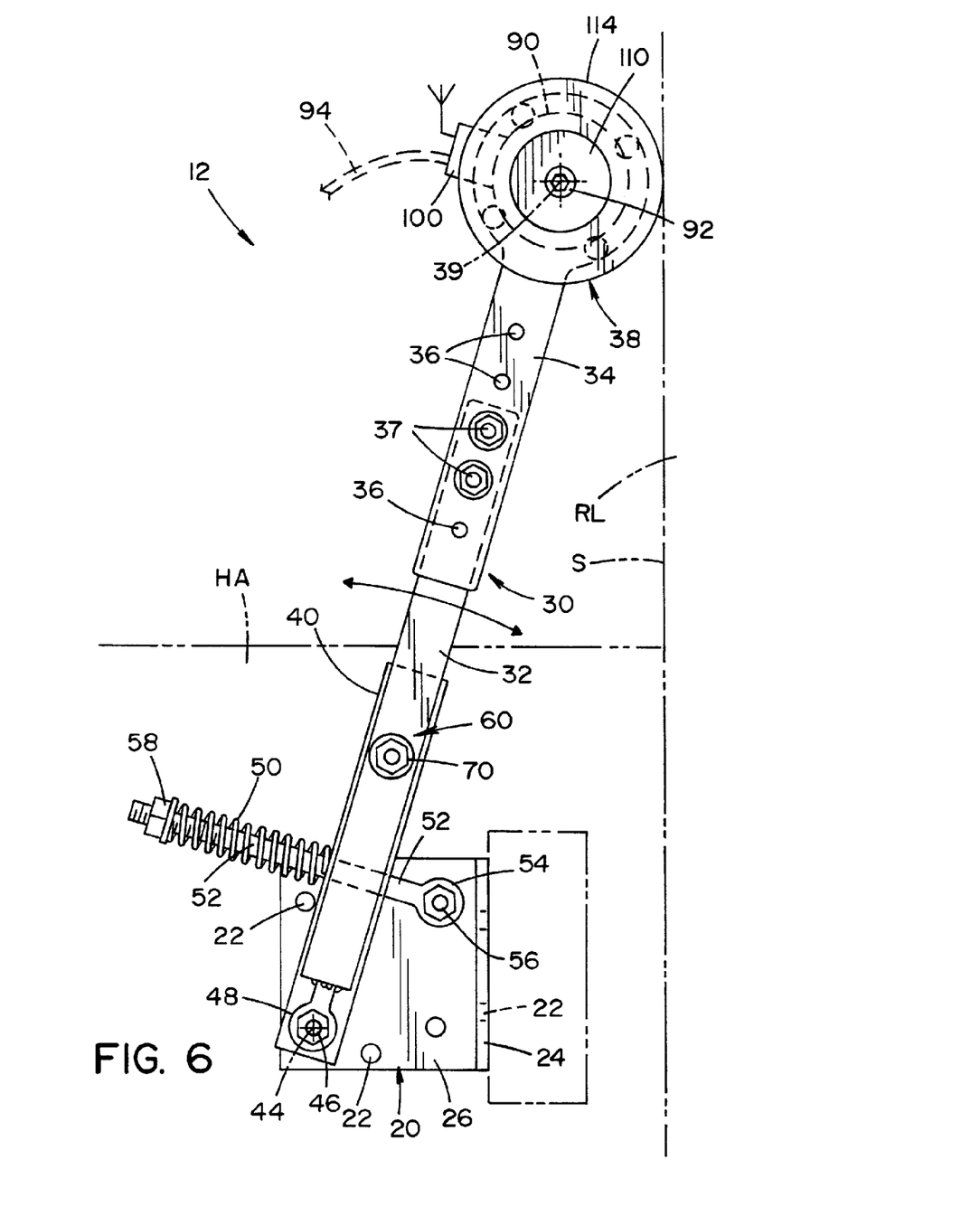
FIG. 6 is a side view of the encoder assembly shown in FIG. 5.
Figure 7:
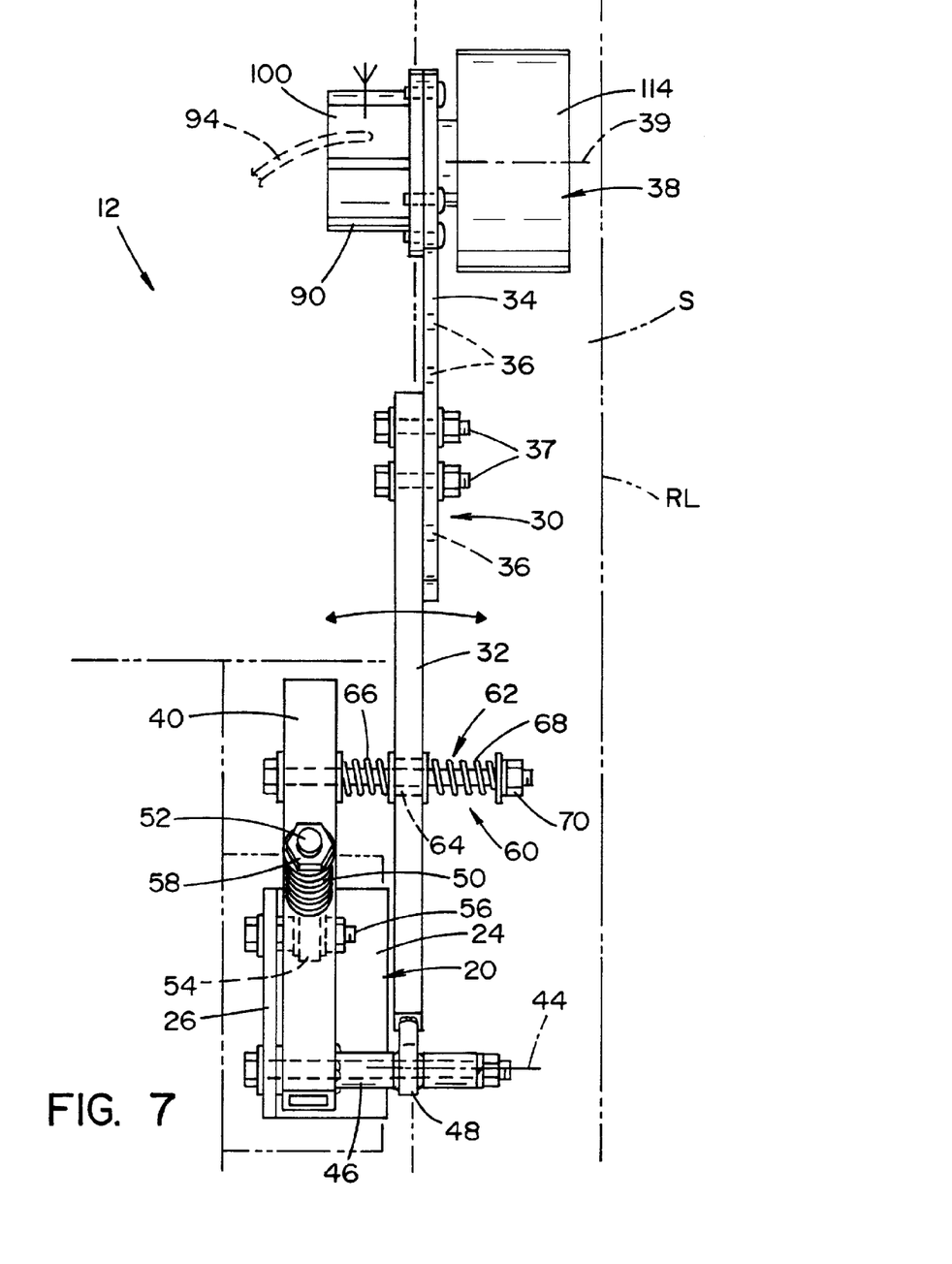
FIG. 7 is a front view of the encoder assembly shown in FIG. 5.
Figure 8:
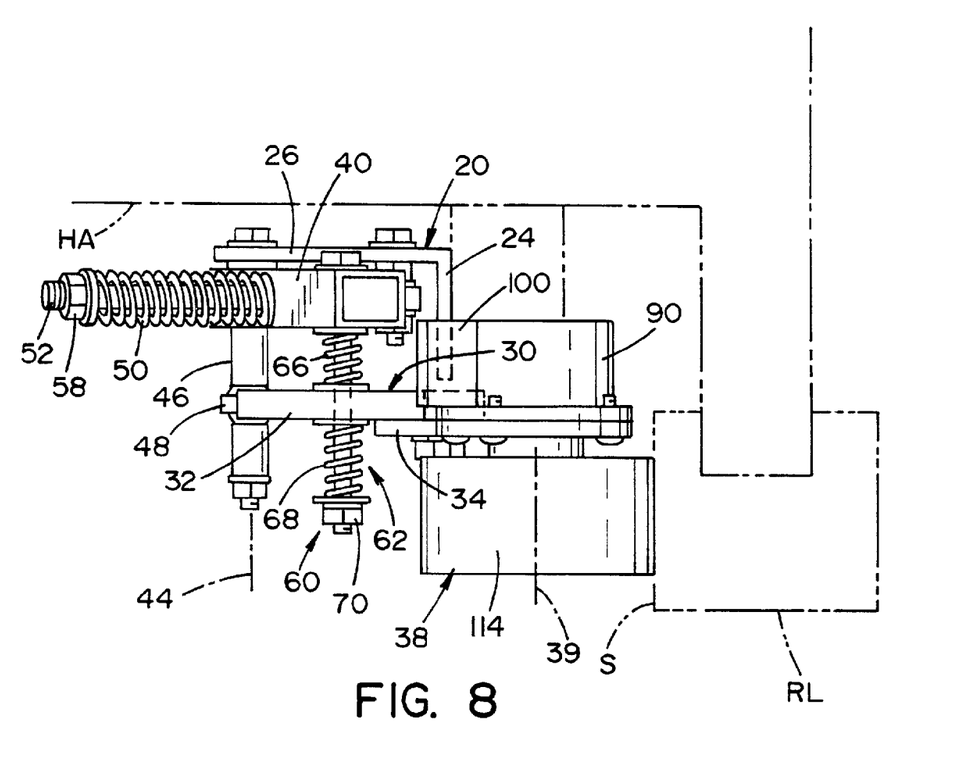
FIG. 8 is a top view of the encoder assembly shown in FIG. 5.

The encoder can be utilized to detect the rotation of the wheel about wheel axis 39 and can communicate this data to a control device (see Likins) by any means known in the art. Further, multiple communication method also could be without detracting from the invention of this application. This can include a wire connection 94 that is directly connected to computing system 16 and/or connected to a separate communication system 14 as is shown in FIG. 2. Further, as is shown in FIGS. 6-7, the encoder assembly can include a built in communication system and/or computing system 100 wherein the encoder assembly can be a self contained system. As can be appreciated, system 100 could also be mounted on bracket 20 wherein wire 94 could join encoder 90 to the system 100 on the bracket.

Further, if the encoder is not a digital encoder, an analog to digital converter can be used to transform the data collected by the encoder into a format that is readable or usable by a computing system. Further, wheel 38 can include a wheel bearing 110 that can be any wheel bearing known in the art, to produce smooth and controlled rotation about the wheel axis.

As can be appreciated, the engagement between a radial surface 114 of wheel 38 and the engaged surface S can influence the accuracy of the system wherein slippage between the respective surfaces can produce errors in depth calculations. Accordingly, the wheel of the encoder assembly must be configured to minimize any slippage between a radial surface 114 and the engaged object. Controlling this engagement can come in many forms. In one respect, the wheel force spring can be utilized to create an engagement force between the radial surface and the engaged surface such that this force is sufficiently high to minimize slippage. In one embodiment, this wheel force is adjustable so that the force can be increased to help reduce wheel slippage by adjustment feature or nut 58. In yet another embodiment, materials having a high coefficient of friction can be utilized to help prevent this slippage. It has been found that urethane wheels are effective in minimizing the slippage between the wheel surface and the engaged surface. Further, a low durometer urethane can also be used; however, there are limits on the durometer wherein a wheel which is easily deformable based on a high wheel force spring can reduce the accuracy of the data acquired. Other ways to reduce wheel slippage include, but are not limited to, surface 114 including at least one of knurling, a geared engagement surface, and a surface features such as a V-shape grove in the wheel surface (not shown) that can increase the contact patch or the like.

Figure 3:
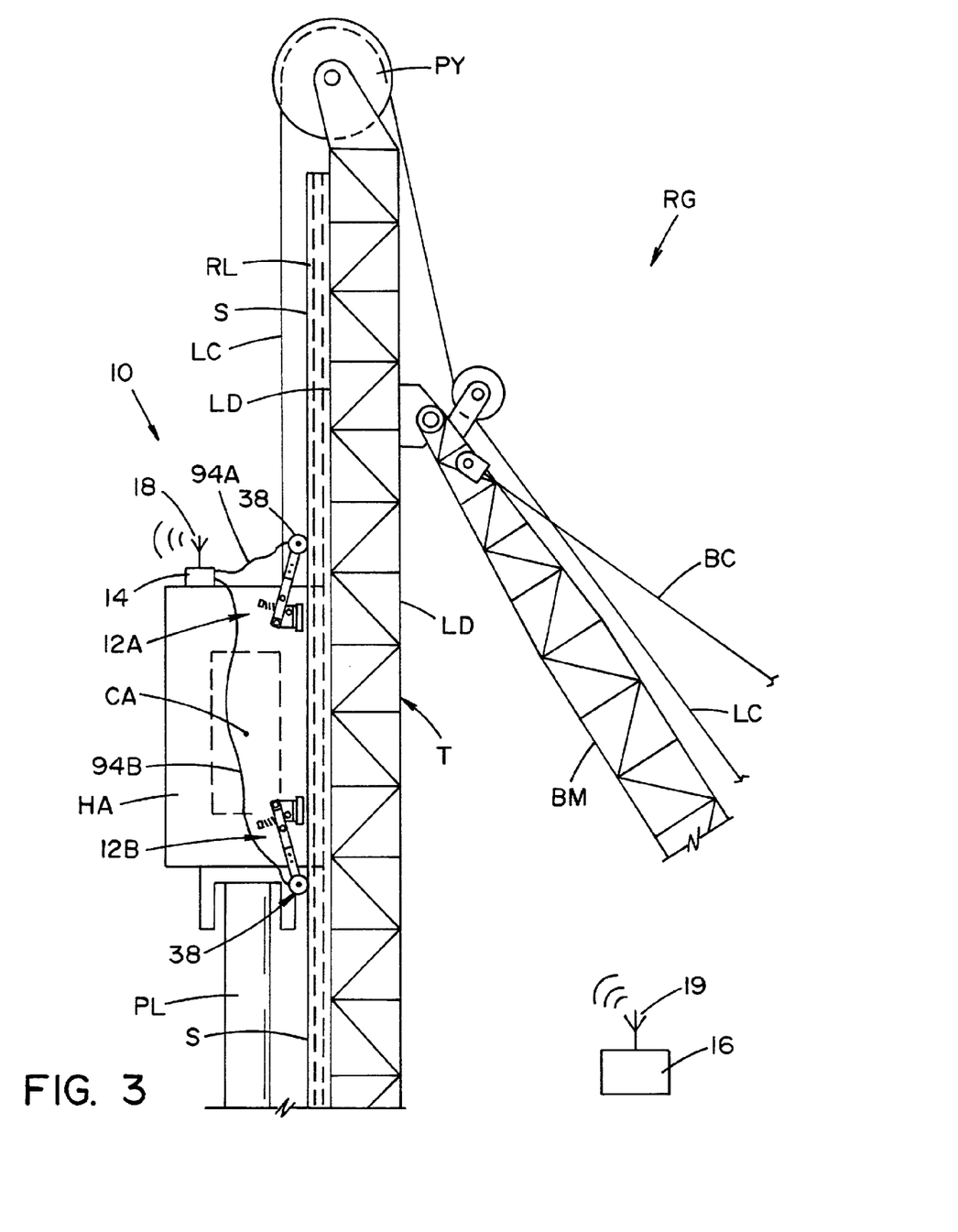
FIG. 3 is an enlarged elevational view of showing a dual encoder assembly arrangement according to another set of embodiments of this application.
Figure 4:
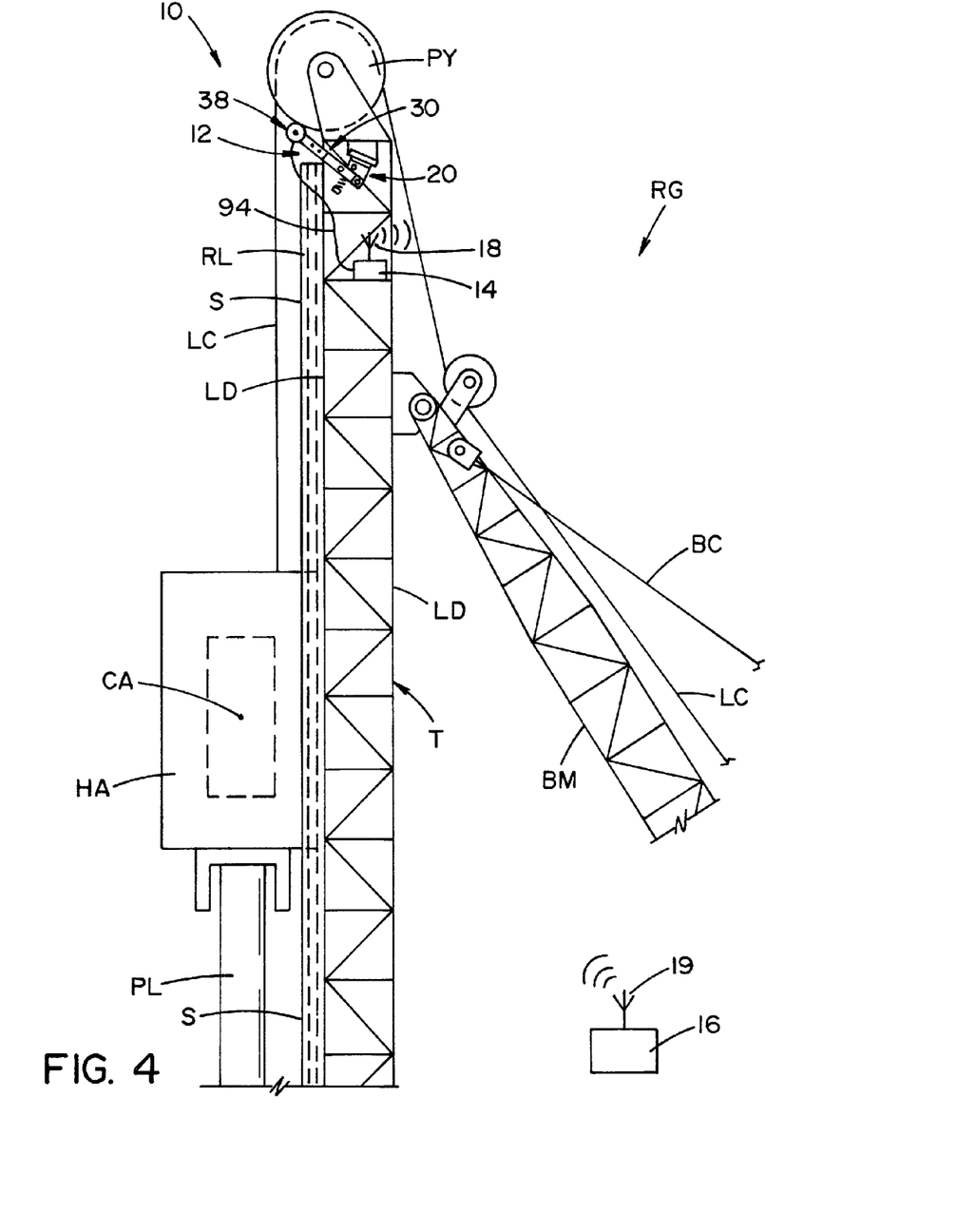
FIG. 4 is an enlarged elevational view of showing a single encoder assembly arrangement according to another set of embodiments of this application.
Figure 5:
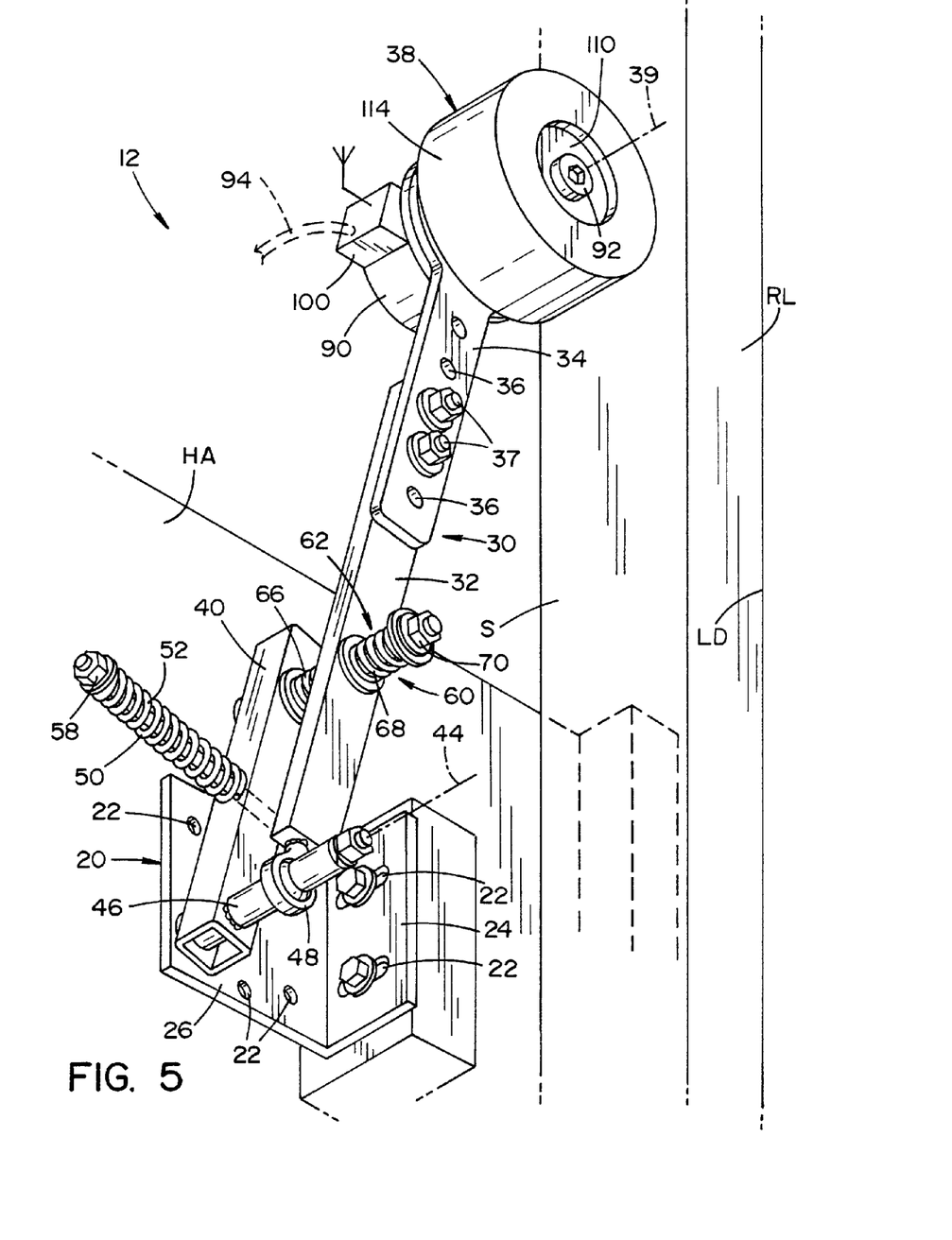
FIG. 5 is a perspective view of an encoder assembly according to certain aspects of this application.

With reference to FIGS. 2-4, the components of this application can be mounted in a wide range of configurations on a wide range of components of rig RG. Further, the computing system to calculate depth, and any other data relating to the installation of the pile, can also be mounted on the rig, off the rig, at the jobsite and/or at any location around the world. In one embodiment shown in FIG. 2, a single encoder assembly 12 is mounted directly to the load box and wheel 38 engages rail RL. In a similar embodiment, wheel 38 can engage one of the leads LD of tower T. As discussed above in greater detail, the encoder assembly can detect changes in depth of the pile by tracking the rotation of wheel 38. Based on the type of pile driving installation, the rotation of the wheel can be in a single direction wherein the calculation of depth is a function of the rotation of the wheel. However, use in installation techniques, such as with driven piles, the upward stroke or movement of the loader box can be compared to the downward movement or stroke of the load to determine how much the load box has moved the pile into the ground layer for each set of strokes.

In other embodiments, such as the one shown in FIG. 3, two (or more) encoder assemblies can be utilized. As shown, encoders 12A and 12B are in system 10. In this particular embodiment, a single communication system 14 can be joined to both encoders 12A and 12B by wires 94A and 94B, respectively. Communication system 14 can use a wireless transmitter 18 to communicate data to computer system 16 by way of receiver 19. As with all systems in this application, wireless transmitters and receivers, such as 18 & 19, can be transceivers to both send and receive data. This can be to both collect data and to control the operation of the system.

In that there can be some play between hammer assembly HA and leads LD, such that the hammer assembly can move relative to leads LD (for example, some limited rotation about an axis CA, etc), multiple encoder assemblies can provide for error correction to further improve measurement accuracy. In yet another embodiment, and as is shown, one encoder assembly 12A can be on the top of box HA and the other can be on the bottom of box HA. This configuration can further ensure that at least one of the encoders is always in engagement with the corresponding lead.

With reference to FIG. 4, the encoder assembly also can be positioned against other components of the rig, such as against one or more of the pulleys on the rig. As is shown, the encoder is secured to tower T and the wheel is aligned so that it engages pulley PY on tower T. While this configuration does not completely remove the errors associated with the wire, it can separate the encoder from the harsh environment associate with a hammer cage or box HA.

Again, while the invention of this application has primarily been described in relation to pile driving equipment, the invention of this application can be used with a wide range of pile installing equipment. Further, the system of this application can also be utilized to monitor the depth of the auger cast system when the grout is pumped into the hole. As is known in the industry, it is important to keep the exit point of the pipe feeding the grout into the hole below the grout line. Therefore, it is also important to know the exact depth of the pipe opening when the grout is being pumped. Therefore, the invention of this application also can be used to determine and/or monitor the pipe depth for pumping this grout into the drilled pile hole.

Further, while considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention.

It is claimed:

1. A measurement device for use with a pile installation machine, the measurement device for determining a depth of a pile being installed into a ground layer by measuring displacement of a working head of the pile installation machine, the measurement device comprising at least one encoder assembly having a support bracket fixably attachable to a first associated structural component of an associated pile installation machine, the support bracket having a mounting arrangement for the fixable attachment to the first structural component and a pivot joint coaxial with a load arm axis, the at least one encoder assembly further including a load arm rotatable about the load arm axis and having a base end near the load arm axis and a distal end spaced from the load arm axis, the load arm further including a wheel near the distal end that is rotatable about a wheel axis, the at least one encoder assembly further including an encoder joined to the wheel such that the wheel drives the encoder as the wheel rotates, the at least one encoder assembly further including a wheel force biasing assembly loaded between the support bracket and the load arm configured to urge the load arm and wheel about the load arm axis into an engaged condition relative to the associate pile installation machine such that the wheel frictionally engages a surface of a second associated structural component and the displacement of the first structural component relative to the surface of the second structural component rotates the wheel about the wheel axis and thus rotates the encoder, the measurement device further including a communication system to send encoder data to an associated computing system for receiving the encoder data to determine at least one of the displacement of the first structural component relative to the surface of the second structural component and the depth of an associate pile, wherein the measurement device is fixably attachable relative to an associated working head of the pile installation machine and the surface of the second associated structural component is a fixed surface on a frame section of the associated pile installation machine.

2. The measurement device of claim 1, wherein the load arm is also pivotable about a second axis transverse to the load arm axis.

3. The measurement device of claim 2, wherein the second axis is aligned with the load arm axis.

4. The measurement device of claim 1, further including a transceiver for communicating with the associated computing system.

5. The measurement device of claim 1, wherein the encoder rotates about the wheel axis.

6. The measurement device of claim 1, wherein the associated pile is an auger cast pile and the displacement is of the auger for the casting of the pile.

7. The measurement device of claim 1, wherein the associated working head includes at least one of a gear box and a hammer cage and the fixed surface on a frame section of the associated pile installation machine includes a surface fixed relative to a support tower of the associated pile installation system.

8. The measurement device of claim 1, wherein the support bracket is an L-shaped bracket having a first and a second leg forming the L-shape, the pivot joint being formed in the first leg, the mounting arrangement being in at least one of the first and the second legs, the mounting arrangement includes a plurality of mounting openings and a plurality of fasteners.

9. The measurement device of claim 1, wherein the load arm has a length and the length is selectively adjustable.

10. A measurement device for use with a pile installation machine, the measurement device for determining a depth of a pile being installed into a ground layer by measuring displacement of a working head of the pile installation machine, the measurement device comprising at least one encoder assembly having a support bracket fixably attachable to a first associated structural component of an associated pile installation machine, the support bracket having a mounting arrangement for the fixable attachment to the first structural component and a pivot joint coaxial with a load arm axis, the at least one encoder assembly further including a load arm rotatable about the load arm axis and having a base end near the load arm axis and a distal end spaced from the load arm axis, the load arm further including a wheel near the distal end that is rotatable about a wheel axis, the at least one encoder assembly further including an encoder joined to the wheel such that the wheel drives the encoder as the wheel rotates, the at least one encoder assembly further including a wheel force biasing assembly loaded between the support bracket and the load arm configured to urge the load arm and wheel about the load arm axis into an engaged condition relative to the associate pile installation machine such that the wheel frictionally engages a surface of a second associated structural component and the displacement of the first structural component relative to the surface of the second structural component rotates the wheel about the wheel axis and thus rotates the encoder, the measurement device further including a communication system to send encoder data to an associated computing system for receiving the encoder data to determine at least one of the displacement of the first structural component relative to the surface of the second structural component and the depth of an associate pile, the load arm is also pivotable about a second axis transverse to the load arm axis, wherein the at least one encoder assembly includes a control arm pivotable about the load arm axis and extending between a base end near the load arm axis and a distal end spaced from the base end, the control arm being axially spaced from the load arm along the load arm axis and including a side load biasing assembly between the control arm base and distal ends, the biasing assembly having a side load shaft generally parallel to and spaced from the load axis that extends between the control arm and the load arm, the side load biasing assembly further including at least one biasing member loaded against the load arm, the at least one biasing members urging the load arm into a centered position while allowing controlled movement of the load arm about the second axis.

11. The measurement device of claim 10, wherein the side load shaft is fixed to one of the control arm and the load arm and extends through an opening in the other of the control arm and the load arm, the at least one biasing member including a pair of biasing members positioned on either side of the opening in the other arm and engaging the other arm.

12. The measurement device of claim 11, wherein the opening in the other of the control arm and the load arm is an elongated slot.

13. The measurement device of claim 10, wherein the wheel force biasing assembly loaded between the support bracket and the load arm includes a wheel force biasing shaft extending between the control arm and the support bracket, the wheel force biasing assembly further including at least one biasing member engaging one of the control arm and the support bracket.

14. The measurement device of claim 10, wherein the at least one encoder assembly further includes a pivot shaft extending from the pivot joint and coaxial with the load arm axis, both the load arm and the control arm being joined to the pivot shaft.

15. A measurement device for use with a pile installation machine, the measurement device for determining a depth of a pile being installed into a ground layer by measuring displacement of a working head of the pile installation machine, the measurement device comprising at least one encoder assembly having a support bracket fixably attachable to a first associated structural component of an associated pile installation machine, the support bracket having a mounting arrangement for the fixable attachment to the first structural component and a pivot joint coaxial with a load arm axis, the at least one encoder assembly further including a load arm rotatable about the load arm axis and having a base end near the load arm axis and a distal end spaced from the load arm axis, the load arm further including a wheel near the distal end that is rotatable about a wheel axis, the at least one encoder assembly further including an encoder joined to the wheel such that the wheel drives the encoder as the wheel rotates, the at least one encoder assembly further including a wheel force biasing assembly loaded between the support bracket and the load arm configured to urge the load arm and wheel about the load arm axis into an engaged condition relative to the associate pile installation machine such that the wheel frictionally engages a surface of a second associated structural component and the displacement of the first structural component relative to the surface of the second structural component rotates the wheel about the wheel axis and thus rotates the encoder, the measurement device further including a communication system to send encoder data to an associated computing system for receiving the encoder data to determine at least one of the displacement of the first structural component relative to the surface of the second structural component and the depth of an associate pile, wherein the at least one encoder assembly includes a first and a second encoder assembly having substantially the same structural features.

16. A system for use with a pile installation machine, the system for determining a depth of a pile being installed into a ground layer by measuring displacement of a working head of the pile installation machine, the system comprising a measurement device having at least one encoder assembly including a support bracket fixably attachable to a first associated structural component of an associated pile installation machine, the support bracket having a mounting arrangement for the fixable attachment to the first structural component and a pivot joint coaxial with a load arm axis, the at least one encoder assembly further including a load arm rotatable about the load arm axis and having a base end near the load arm axis and a distal end spaced from the load arm axis, the load arm further including a wheel near the distal end that is rotatable about a wheel axis, the at least one encoder assembly further including an encoder joined to the wheel such that the wheel drives the encoder as the wheel rotates, the at least one encoder assembly further including a wheel force biasing assembly loaded between the support bracket and the load arm configured to urge the load arm and wheel about the load arm axis into an engaged condition relative to the associate pile installation machine such that the wheel frictionally engages a surface of a second associated structural component and the displacement of the first structural component relative to the surface of the second structural component rotates the wheel about the wheel axis and thus rotates the encoder; a communication system and a computing system, the communication system controlling the flow of data between the measurement device and the computing system wherein at least the data generated by the encoder is transmitted to the computing system, the computing system configured to determine the depth of the associate pile from the data produced by the at least one encoder assembly, the load arm axis is also pivotable about a second axis transverse to the load arm axis, the at least one encoder further includes a control arm pivotable about the load arm axis and extending between a base end near the load arm axis and a distal end spaced from the base end, the control arm being axially spaced from the load arm along the load arm axis and including a side load biasing assembly between the control arm base and distal ends, the biasing assembly having a side load shaft generally parallel to and spaced from the load axis that extends between the control arm and the load arm, the side load biasing assembly further including at least one biasing member loaded against the load arm, the at least one biasing members urging the load arm into a desired position while allowing controlled movement of the load arm about the second axis.

17. The system of claim 16, wherein the side load shaft is fixed to one of the control arm and the load arm and extends through an opening in other of the control arm and the load arm, the at least one biasing member including a pair of biasing members position on either side of the opening in the other arm and engaging the other arm.

18. The system of claim 16, wherein the wheel force biasing assembly loaded between the support bracket and the load arm includes a wheel force biasing shaft extending between the control arm and the support bracket, the wheel force biasing assembly further including at least one biasing member engaging one of the control arm and the support bracket.

19. The system of claim 16, further including a transceiver for communicating between the measurement device and the computing system.

20. The system of claim 16, wherein the at least one encoder assembly includes a first and as second encoder assembly, the computing system being configured to compare readings from both the first and second encoder assemblies.

21. The system of claim 16, wherein the associated pile is an auger cast pile and the displacement is of the auger for casting the pile.

22. The system of claim 16, wherein the first associated structural component of the pile installation machine is at least one of a working head, a gear box, a hammer cage and a support tower of the associated pile installation machine and the second associated structural component is at least one of the support tower and a cable pulley of the associated pile installation machine.

23. The system of claim 16, wherein the computing system is a hand held device.

24. The system of claim 16, wherein the computing system is a remote computing system.

25. A system for use with a pile installation machine, the system for determining a depth of a pile being installed into a ground layer by measuring displacement of a working head of the pile installation machine, the system comprising a measurement device having at least one encoder assembly including a support bracket fixably attachable to a first associated structural component of an associated pile installation machine, the support bracket having a mounting arrangement for the fixable attachment to the first structural component and a pivot joint coaxial with a load arm axis, the at least one encoder assembly further including a load arm rotatable about the load arm axis and having a base end near the load arm axis and a distal end spaced from the load arm axis, the load arm further including a wheel near the distal end that is rotatable about a wheel axis, the at least one encoder assembly further including an encoder joined to the wheel such that the wheel drives the encoder as the wheel rotates, the at least one encoder assembly further including a wheel force biasing assembly loaded between the support bracket and the load arm configured to urge the load arm and wheel about the load arm axis into an engaged condition relative to the associate pile installation machine such that the wheel frictionally engages a surface of a second associated structural component and the displacement of the first structural component relative to the surface of the second structural component rotates the wheel about the wheel axis and thus rotates the encoder; a communication system and a computing system, the communication system controlling the flow of data between the measurement device and the computing system wherein at least the data generated by the encoder is transmitted to the computing system, the computing system configured to determine the depth of the associate pile from the data produced by the at least one encoder assembly, wherein the encoder assembly further includes a pivot shaft extending from the pivot joint and coaxial with the load arm axis, the load arm being joined to the pivot shaft.

26. A method of determining a depth of a pile being installed into a ground layer by measuring displacement of a working head of a pile installation machine and not the movement of the operating cable of the pile installation machine, the method comprising the steps of:

providing a measurement device having at least one encoder assembly including a support bracket selectively attachable to a first associated structural component of an associated pile installation machine, the support bracket having a mounting arrangement for the selective attachment to the first structural component and a pivot joint coaxial with a load arm axis, the at least one encoder assembly further including a load arm rotatable about the load arm axis and having a base end near the load arm axis and a distal end spaced from the load arm axis, the load arm further including a wheel near the distal end that is rotatable about a wheel axis, the at least one encoder assembly further including an encoder joined to the wheel such that the wheel drives the encoder as the wheel rotates, the at least one encoder assembly further including a wheel force biasing assembly loaded between the support bracket and the load arm configured to urge the load arm and wheel about the load arm axis into an engaged condition relative to the associate pile installation machine such that the wheel frictionally engages a surface of a second associated structural component spaced from an operating cable of the pile installation machine and the displacement of the first structural component relative to the second structural component rotates the wheel about the wheel axis and thus rotates the encoder;

securing the at least one encoder assembly to the first structural component;

adjusting the at least one encoder assembly such that the wheel frictionally engages the surface of the second associated structural component;

providing a computing system;

providing a communication system to control the flow of data between the measurement device and the computing system;

generating rotational data based on the rotation of the wheel during the installation of the pile;

determining a displacement between the first structural component and the surface of the second structural component based on the rotational data; and, calculating a depth of the pile based the displacement.

27. The method of claim 26, further including the step of mounting the communication system to the first structural object, the communication system including a wireless connection with the computing system.

28. The method of claim 26, further including the step of stopping the installation of the pile when a desired depth has been reached.

29. The method of claim 26, wherein the load arm axis is also pivotable about a second axis transverse to the load arm axis.

30. The method of claim 26, wherein the at least one encoder assembly includes a first and a second encoder assembly of generally equal construction, the method further including the step of collecting data from both the first and second encoder assemblies and comparing the data collected from the first and second encoder assemblies for the calculating step.

31. The method of claim 26, further including the step of transmitting the rotational data to a remote location and at least one of the determining and calculating steps being performed at the remote location.

32. The method of claim 26, wherein the securing the at least one encoder assembly to the first structural component is securing the at least one encoder assembly relative to a working head of the pile installation machine.

33. A method of determining a depth of a pile being installed into a ground layer by measuring displacement of a working head of a pile installation machine, the method comprising the steps of:

providing a measurement device having at least one encoder assembly including a support bracket fixably attachable to a first associated structural component of an associated pile installation machine, the support bracket having a mounting arrangement for the fixable attachment to the first structural component and a pivot joint coaxial with a load arm axis, the at least one encoder assembly further including a load arm rotatable about the load arm axis and having a base end near the load arm axis and a distal end spaced from the load arm axis, the load arm further including a wheel near the distal end that is rotatable about a wheel axis, the at least one encoder assembly further including an encoder joined to the wheel such that the wheel drives the encoder as the wheel rotates, the at least one encoder assembly further including a wheel force biasing assembly loaded between the support bracket and the load arm configured to urge the load arm and wheel about the load arm axis into an engaged condition relative to the associate pile installation machine such that the wheel frictionally engages a surface of a second associated structural component and the displacement of the first structural component relative to the second structural component rotates the wheel about the wheel axis and thus rotates the encoder, the load arm axis is also pivotable about a second axis transverse to the load arm axis wherein the at least one encoder further include a control arm pivotable about the load arm axis and extending between a base end near the load arm axis and a distal end spaced from the base end, the control arm being axially spaced from the load arm along the load arm axis and including a side load biasing assembly between the control arm base and distal ends, the biasing assembly having a side load shaft generally parallel to and spaced from the load axis that extends between the control arm and the load arm, the side load biasing assembly further including at least one biasing member loaded against the load arm, the at least one biasing members urging the load arm into a centered position while allowing controlled movement of the load arm about the second axis securing the at least one encoder assembly to the first structural component;

adjusting the at least one encoder assembly such that the wheel frictionally engages the surface of the second associated structural component;

providing a computing system;

providing a communication system to control the flow of data between the measurement device and the computing system;

generating rotational data based on the rotation of the wheel during the installation of the pile;

determining a displacement between the first structural component and the surface of the second structural component based on the rotational data; and, calculating a depth of the pile based the displacement.

34. A measurement device for use with a pile installation machine, the measurement device for determining a depth of a pile being installed into a ground layer by measuring displacement of a working head of the pile installation machine and not the cable used to move the working head, the measurement device comprising an a support bracket that is selectively and removably attachable to a first associated structural component of an associated pile installation machine, the support bracket having a mounting arrangement for the selectively and removably attachment to the first structural component, the measurement device further including a pivot joint coaxial with a load arm axis, the device further including a load arm rotatable about the load arm axis and having a base end near the load arm axis and a distal end spaced from the load arm axis, the load arm further including a wheel near the distal end that is rotatable about a wheel axis, the device further including an encoder joined relative to the wheel such that the wheel drives the encoder as the wheel rotates, the device further including a wheel force biasing assembly loaded between the support bracket and the load arm configured to urge the load arm and wheel about the load arm axis into an engaged condition relative to the associate pile installation machine such that the wheel frictionally engages a surface of a second associated structural component spaced from associated operating cables of the associated pile installation machine, the displacement of the first structural component relative to the surface of the second structural component rotating the wheel about the wheel axis and thus rotates the encoder to determine the displacement of the associated working head of the associated pile installation machine without engaging the associated operating cables.

35. The measurement device of claim 34, wherein the first associated structural component of an associated pile installation machine is fixed relative to an associated working head of the pile installation machine and the surface of the second associated structural component is a fixed surface on a frame section of the associated pile installation machine.

36. The measurement device of claim 35, wherein the associated working head includes at least one of a gear box and a hammer cage and the fixed surface on a frame section of the associated pile installation machine includes a surface fixed relative to a support tower of the associated pile installation system.

* * * * *